US008022669B2

(12) United States Patent
Li

(10) Patent No.: US 8,022,669 B2
(45) Date of Patent: Sep. 20, 2011

(54) BATTERY MANAGEMENT SYSTEM

(75) Inventor: Guoxing Li, Sunnyvale, CA (US)

(73) Assignee: O2Micro International Limited, Grand Cayman (KY)

( * ) Notice: Subject to any disclaimer, the term of this patent is extended or adjusted under 35 U.S.C. 154(b) by 144 days.

(21) Appl. No.: 12/495,495

(22) Filed: Jun. 30, 2009

(65) Prior Publication Data

US 2010/0173180 A1 Jul. 8, 2010

Related U.S. Application Data

(60) Provisional application No. 61/142,689, filed on Jan. 6, 2009.

(51) Int. Cl.
*H01M 10/46* (2006.01)

(52) U.S. Cl. .................................................. 320/122

(58) Field of Classification Search .................. 320/103, 320/107, 114, 116, 117, 120, 122
See application file for complete search history.

(56) References Cited

U.S. PATENT DOCUMENTS

| | | | | |
|---|---|---|---|---|
| 4,716,354 | A * | 12/1987 | Hacker | 320/114 |
| 4,723,241 | A | 2/1988 | Grobel et al. | |
| 5,423,050 | A | 6/1995 | Taylor et al. | |
| 5,850,351 | A | 12/1998 | Lotfy et al. | |
| 6,031,354 | A * | 2/2000 | Wiley et al. | 320/116 |
| 6,094,053 | A | 7/2000 | Harvey | |
| 6,172,479 | B1 | 1/2001 | Barton | |
| 6,281,684 | B1 | 8/2001 | James | |
| 6,404,166 | B1 | 6/2002 | Puchianu | |
| 6,611,774 | B1 | 8/2003 | Zaccaria | |
| 7,023,845 | B1 * | 4/2006 | Simons et al. | 370/389 |
| 7,466,104 | B2 | 12/2008 | Wang et al. | |
| 7,511,457 | B2 | 3/2009 | Emori et al. | |
| 7,615,966 | B2 | 11/2009 | Houldsworth et al. | |
| 2004/0164706 | A1 | 8/2004 | Osborne | |
| 2005/0275389 | A1 | 12/2005 | Cordoba | |
| 2006/0072262 | A1 * | 4/2006 | Paik et al. | 361/62 |
| 2006/0259280 | A1 | 11/2006 | Zaccaria | |
| 2007/0182377 | A1 | 8/2007 | Vandensande | |

FOREIGN PATENT DOCUMENTS

WO 9527358 A1 10/1995

OTHER PUBLICATIONS

EP search report received in Europe Application No. 10150165.8 dated Oct. 18, 2010.

* cited by examiner

*Primary Examiner* — Edward Tso

(57) ABSTRACT

A battery management system can include a battery having a plurality of cells, a plurality of devices coupled to the battery, and a control unit coupled to a first device of the devices. The devices can assess the statuses of the cells. The control unit can communicate with a destination device of the devices via a default path and can communicate with the destination device via a backup path if an undesirable condition occurs in the default path.

20 Claims, 10 Drawing Sheets

BATTERY MANAGEMENT SYSTEM

RELATED APPLICATION

This application claims priority to U.S. Provisional Application No. 61/142,689, filed on Jan. 6, 2009, which is hereby incorporated by reference in its entirety.

BACKGROUND

Currently, Li-ion batteries have been applied in green vehicles, such as electric vehicles (EVs) and hybrid electric vehicles (HEVs). The workable voltage of a single cell in a Li-ion battery is approximately 3-4 volts, but EVs and HEVs usually require higher voltages up to more than 100 volts. Usually, multiple cells are coupled to each other in series to drive EVs and HEVs.

In battery management, a number of cells are arranged as one or more battery packs, and an analog front end (AFE) device is coupled to each battery pack to assess the status of the battery packs or the cells, such as their voltage and temperature. The digital data indicative of the status of the battery pack or the cells is transferred to a microprocessor for various purposes such as battery protection. A communication bus between the microprocessor and each AFE device is also needed.

FIG. 1 shows a conventional battery management system 100 with an opto-coupler based vertical bus. The AFE devices 122, 124 and 126 are coupled to the battery packs 112, 114 and 116, respectively, for accessing the status of each cell in the battery packs. Opto-coupler blocks 132, 134 and 136 establish a communication bus between the AFE devices 122, 124 and 126 and a central electronics control unit (CECU) 140. Each opto-coupler block includes two opto-couplers for each wire of the bus.

The conventional battery management system 100 with an opto-coupler based vertical bus suffers from high cost and high power consumption since opto-couplers are relatively expensive and their driving capability requires mille-amperes of current. Currently, a battery management system with a vertical bus in daisy chain architecture is widely used to reduce costs. However, communication between the AFE device and the CECU may be broken if there is a disconnect in the vertical bus in the daisy chain architecture. As a result, the reliability of the battery management system may be reduced.

SUMMARY

In one embodiment, a battery management system includes a battery having a plurality of cells, a plurality of devices coupled to the battery, and a control unit coupled to a first device of the devices. The devices can assess the statuses of the cells. The control unit can communicate with a destination device of the devices via a default path and for communicating with the destination device via a backup path if an undesirable condition occurs in the default path. As a result, the reliability of the battery management system can be improved.

BRIEF DESCRIPTION OF THE DRAWINGS

Features and advantages of embodiments of the subject matter will become apparent as the following detailed description proceeds, and upon reference to the drawings, wherein like numerals depict like parts, and in which.

DETAILED DESCRIPTION

Figure 1:
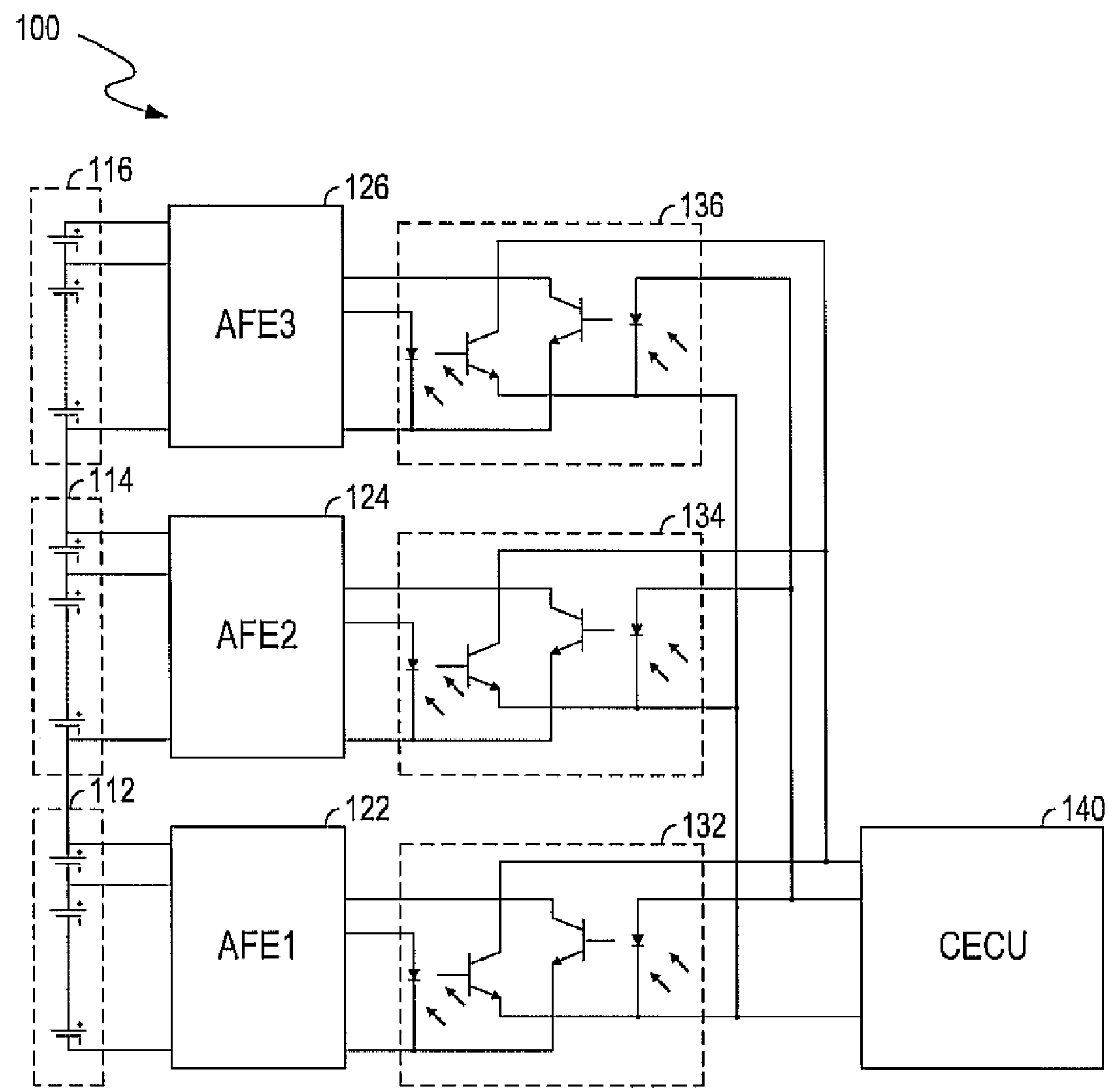
FIG. 1 is a block diagram showing a conventional battery management system with an opto-coupler based vertical bus.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "determining," "enabling," "detecting" or the like, refer to the actions and processes (e.g., flowchart 1000 of FIG. 10) of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provide a battery management system. In an embodiment, a control unit can communicate with a destination front end device in the system via a default path and can communicate with the destination device via a backup path if an undesirable condition occurs in the default path. Advantageously, the reliability of the system can be improved.

Figure 2:
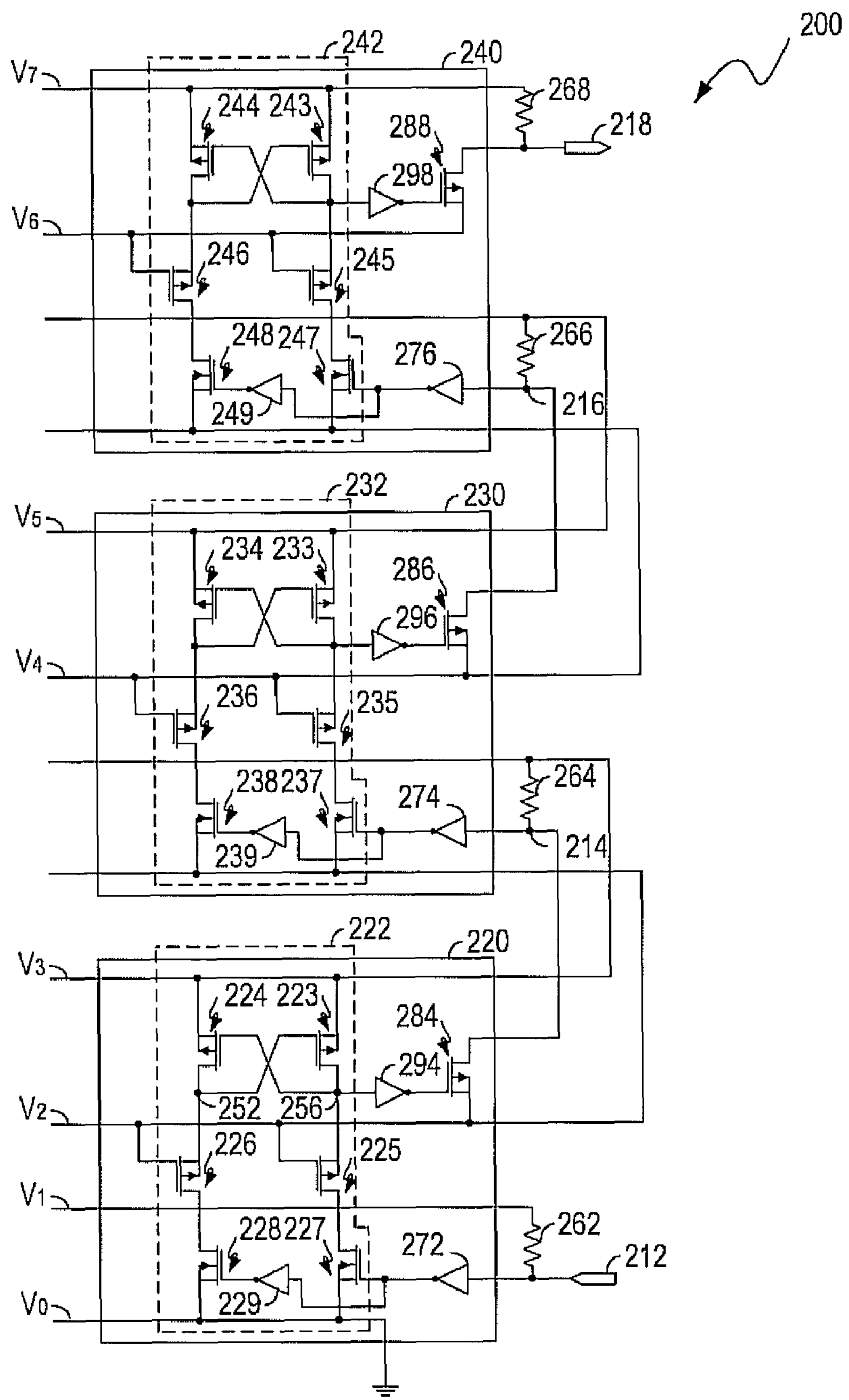
FIG. 2 is a block diagram showing a vertical bus circuit according to one embodiment of the present invention.

FIG. 2 shows a vertical bus circuit 200 according to one embodiment of the present invention. The vertical bus circuit 200 includes three bus blocks 220, 230 and 240 and multiple resistors 262, 264, 266 and 268. As shown in FIG. 2, the bus blocks 220, 230 and 240 are similar to each other. Although three bus blocks are shown in FIG. 2, the present invention is not so limited. In other embodiments, the vertical bus circuit 200 may include more than three or less than three bus blocks.

The bus blocks 220, 230 and 240 may each utilize a different voltage. Taking the bus block 220 as an example, a bus signal is input into an input port 212 of the bus block 220 and transmitted to the bus block 230. At the input port 212 of the bus block 220, the low level voltage is $V_0$ and the high level voltage is $V_1$. When the bus signal is transmitted to the bus block 230 at a node 214, the low level voltage is $V_2$ and the high level voltage is $V_3$, where $V_2$ and $V_3$ are different from $V_0$ and $V_1$, respectively. Similarly, the bus signal can be transmitted from the bus block 230 to the bus block 240.

The bus blocks 220, 230 and 240 transmit a bus signal in the upward direction (with respect to the orientation of FIG. 2). For example, in the vertical bus circuit 200, the bus block 220 is a bottom bus block and the bus block 240 is a top bus block. A bus signal is input into an input port 212 of the bus block 220, and the bus signal is transmitted to the bus block 240 and output from an output port 218 of the bus block 240.

The bus block 220 includes an upward signal path 222, inverter gates 272 and 294, and a FET 284, in one embodiment. The upward signal path 222 includes FETs 223, 224, 225, 226, 227 and 228, and an inverter gate 229, in one embodiment. The bus block 230 includes an upward signal path 232, inverter gates 274 and 296, and a FET 286. The upward signal path 232 includes FETs 233, 234, 235, 236, 237 and 238, and an inverter gate 239. The bus block 240 includes an upward signal path 242, inverter gates 276 and 298, and a FET 288. The upward signal path 242 includes FETs 243, 244, 245, 246, 247 and 248, and an inverter gate 249.

The upward signal paths 222, 232, and 242 in the bus blocks 220, 230, and 240 translate (increase or shift) the bus signal from a low voltage level to a high voltage level. For example, the signal path 222 in the bus block 220 translates the bus signal from a low voltage level (VDD=$V_1$, GND=$V_0$) to a high voltage level (VDD=$V_3$, GND=$V_2$).

The inverter gate 294 and the FET 284 of the bus block 220, and the resistor 264 and the inverter gate 274 of the bus block 230, transmit the bus signal from the bus block 220 to the bus block 230, in one embodiment. Similarly, the inverter gate 296 and the FET 286 of the bus block 230, and the resistor 266 and the inverter gate 276 of the bus block 240, transmit the bus signal from the bus block 230 to the bus block 240, in one embodiment.

When the bus signal that is input at the input port 212 of the bus block 220 is in a high state or the voltage of the bus signal input at the input port 212 is $V_1$, then the FET 227 is turned off and the FET 228 is turned on, and thus the voltage at a node 252 is driven low. The gate voltage of the FET 223 is driven low so as to turn on the FET 223. As such, the voltage at a node 256 at the drain of the FET 223 is driven high and the voltage at the gate of the FET 284 is driven low by the inverter gate 294 so as to turn off the FET 284. The FET 284 is coupled to the resistor 264 to output the bus signal at the node 214 and the voltage at the node 214 is in a high state (the voltage is $V_3$).

On the other hand, when the bus signal input from the input port 212 is in a low state or the voltage of the bus signal inputted at the input port 212 is $V_0$, then the FET 228 is turned off and the FET 227 is turned on, and thus the voltage at a node 256 is driven low. Then, the voltage at the gate of the FET 284 is driven high so as to turn on the FET 284. The FET 284 is coupled to the resistor 264 to output the bus signal at the node 214 and the voltage at the node 214 is in a low state (the voltage is $V_2$).

In one embodiment, the FETs 225 and 226 can be incorporated to decrease the full swing of the voltage at the nodes 256 and 252, respectively. Thus, the voltage at the nodes 256 and 252 has the full swing from $V_3$ to $V_2$. Consequently, the power consumption can be decreased, and the bus signal speed can be increased.

Therefore, the bus signal can be transmitted through the bus block 220 from the input port 212 to the node 214. In a similar manner, the bus signal is transmitted through the bus block 230 from the node 214 to the node 216, and then transmitted through the bus block 240 and output at the output port 218. In other words, the bus signal is translated from a low voltage level (VDD=$V_1$, GND=$V_0$) to a high voltage level (VDD=$V_7$, GND=$V_6$). Thus, when the bus signal input at the input port 212 is in a high state, the output bus signal at the output port 218 is in a high state, OUT=1. When the bus signal input at the input port 212 is in a low state, the output bus signal at the output port 218 is in a low state, OUT=0.

Figure 3:
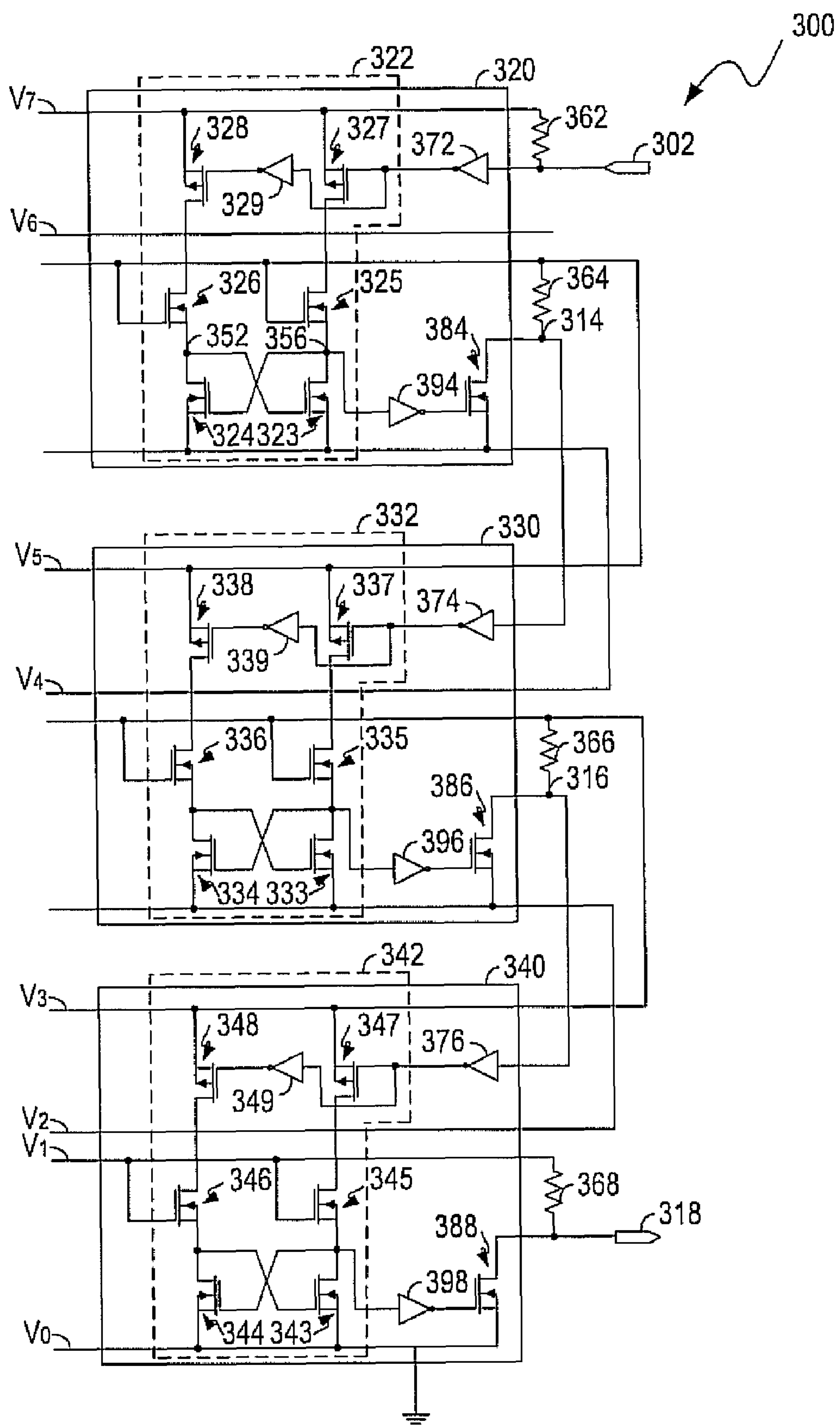
FIG. 3 is a block diagram showing a vertical bus circuit according to one embodiment of the present invention.

FIG. 3 shows a vertical bus circuit 300 according to one embodiment of the present invention. The vertical bus circuit 300 includes three bus blocks 320, 330 and 340 and multiple resistors 362, 364, 366 and 368. As shown in FIG. 3, the bus blocks 320, 330 and 340 are similar to each other. Although three bus blocks are shown in FIG. 3, the present invention is not so limited.

The bus blocks 320, 330 and 340 utilize different voltages. Taking the bus block 320 as an example, a bus signal is input into an input port 312 of the bus block 320 and transmitted to the bus block 330. At the input port 312 of the bus block 320, the low level voltage is $V_6$ and the high level voltage is $V_7$. When the bus signal is transmitted to the bus block 330 at a node 314, the low level voltage is $V_4$ and the high level voltage is $V_5$. Similarly, the bus signal can be transmitted from the bus block 330 to the bus block 340.

The bus blocks 320, 330 and 340 transmit a bus signal in the downward direction (considering the orientation of FIG. 3). For example, in the vertical bus circuit 300, the bus block 320 is a top bus block and the bus block 340 is a bottom bus block. A bus signal is input into an input port 312 of the bus block 320, and the bus signal is transmitted to the bus block 340 and output from an output port 318 of the bus block 340.

The bus block 320 includes a downward signal path 322, inverter gates 372 and 394, and a FET 384, in one embodiment. The downward signal path 322 includes FETs 323, 324, 325, 326, 327 and 328, and an inverter gate 329, in one embodiment. The bus block 330 includes a downward signal path 332, inverter gates 374 and 396, and a FET 386. The downward signal path 332 includes FETs 333, 334, 335, 336, 337 and 338, and an inverter gate 339. The bus block 340 includes a downward signal path 342, inverter gates 376 and 398, and a FET 388. The downward signal path 342 includes FETs 343, 344, 345, 346, 347 and 348, and an inverter gate 349.

The downward signal paths 322, 332 and 342 in the bus blocks 320, 330 and 340 translate the bus signal from a high voltage level to a low voltage level. For example, the signal path 322 in the bus block 320 translates the bus signal from a high voltage level (VDD=$V_7$, GND=$V_6$) to a low voltage level (VDD=$V_5$, GND=$V_4$).

The inverter gate 394 and the FET 384 of the bus block 320, and the resistor 364 and the inverter gate 374 of the bus block 330, transmit the bus signal from the bus block 320 to the bus block 330, in one embodiment. Similarly, the inverter gate 396 and the FET 386 of the bus block 330, and the resistor 366 and the inverter gate 376 of the bus block 340, transmit the bus signal from the bus block 330 to the bus block 340, in one embodiment.

When the bus signal input at the input port 312 of the bus block 320 is in a high state, IN=1, or the voltage of the bus signal input at the input port 312 is $V_7$, then the FET 328 is turned off and the FET 327 is turned on, and thus the voltage at a node 356 is driven high. Then, the voltage at the gate of the FET 384 is driven low so as to turn off the FET 384. The FET 384 is coupled to the resistor 364 to output the bus signal at the node 314 and the voltage at the node 314 is in a high state (the voltage is $V_5$).

On the other hand, when the bus signal input at the input port 312 is in a low state, IN=0, or the voltage of the bus signal input at the input port 312 is $V_6$, then the FET 327 is turned off and the FET 328 is turned on, and thus the voltage at a node 352 is driven high. The gate voltage of the FET 323 is driven high so as to turn on the FET 323. As such, the voltage at a node 356 at the drain of the FET 323 is driven low and the voltage at the gate of the FET 384 is driven high by the inverter gate 394 so as to turn on the FET 384. The FET 384 is coupled to the resistor 364 to output the bus signal at the node 314 and the voltage at the node 314 is in a low state (the voltage is $V_4$).

In one embodiment, the FETs 325 and 326 can be incorporated to decrease the full swing of the voltage at the nodes 356 and 352, respectively. Thus, the voltage at the nodes 356 and 352 has the full swing from $V_5$ to $V_4$, respectively. Consequently, the power consumption can be decreased, and the bus signal speed can be increased.

Therefore, the bus signal can be transmitted through the bus block 320 from the input port 312 to the node 314. In a similar manner, the bus signal is then transmitted through the bus block 330 from the node 314 to the node 316, and then transmitted through the bus block 340 and output at the output port 318. Thus, when the bus signal input at the input port 312 is in a high state, the output bus signal at the output port 318 is in a high state, OUT=1. When the bus signal input at the input port 312 is in a low state, the output bus signal at the output port 318 is in a low state, OUT=0.

Figure 4:
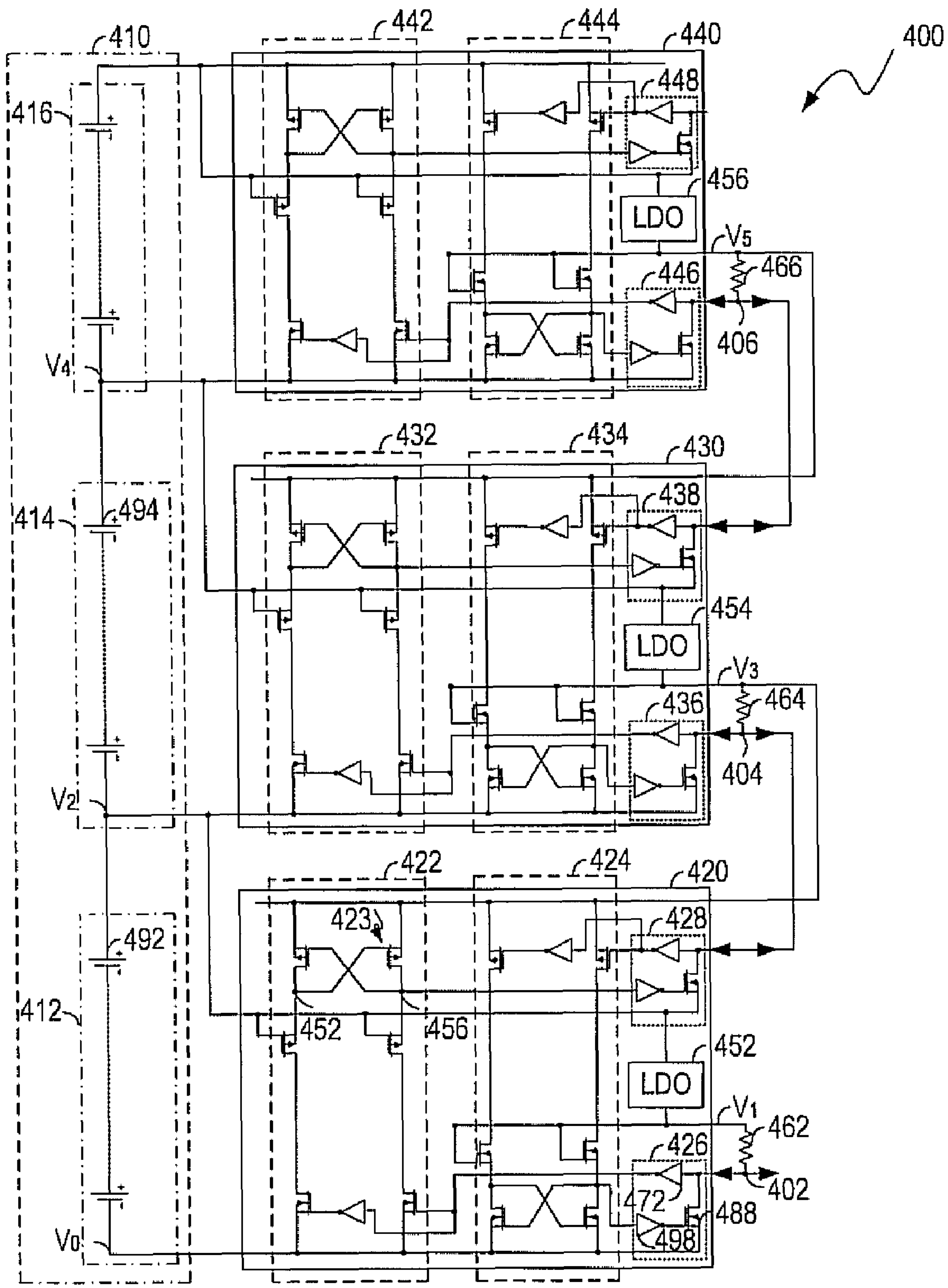
FIG. 4 is a block diagram showing a vertical bus circuit for a battery management system according to one embodiment of the present invention.

FIG. 4 shows a vertical bus circuit 400 for a battery management system according to one embodiment of the present invention. The battery 410 includes three battery packs 412, 414 and 416. The vertical bus circuit 400 is configured for a 1-wire bus and includes three bus blocks 420, 430 and 440 and multiple resistors 462, 464 and 466. Each of the bus blocks 420, 430 and 440 is identical and can be formed as an integrated circuit (IC) chip, in one embodiment. Although three bus blocks are shown in FIG. 4, the present invention is not so limited.

The bus block 420 includes an upward signal path 422, a downward signal path 424 and I/O devices 426 and 428. Similarly, the bus block 430 includes an upward signal path 432, a downward signal path 434 and I/O device 436 and 438. The bus block 440 includes an upward signal path 442, a downward signal path 444 and I/O device 446 and 448. The upward signal paths 422, 432 and 442 are similar to the upward signal paths 222, 232 and 242 shown in FIG. 2. The downward signal paths 424, 434 and 444 are similar to the downward signal paths 342, 332 and 322 shown in FIG. 3.

In another embodiment, the vertical bus circuit 400 can include bus blocks each having two upward signal paths, two downward signal paths and four I/O devices for a 2-wire bus.

The I/O device 426 includes the inverter gate 472, which is similar to the inverter gate 272 shown in FIG. 2, and the inverter gate 498 and the FET 488, which are respectively similar to the inverter gate 398 and the FET 388 shown in FIG. 3. The I/O device 428, the I/O device 436, the I/O device 438, the I/O device 446, and the I/O device 448 are similar to the I/O device 426, and so are not further described.

The bus blocks 420, 430 and 440 further include multiple voltage regulators, respectively. In this embodiment, the multiple voltage regulators can be multiple low drop-out (LDO) voltage regulators 452, 454 and 456.

The voltage at the positive terminal of one cell in each of battery packs 412, 414 and 416 and output voltages of each of the LDOs are provided for enabling bus signal transmission through the bus blocks, in one embodiment. For example, voltage $V_4$ is the voltage at the positive terminal of a cell 494 in the battery pack 414, and voltage $V_2$ is the voltage at the positive terminal of a cell 492 in the battery pack 412. The voltage $V_4$ is supplied to the LDO 454 in the bus block 430 and an output voltage $V_3$ is output by the LDO 454. As such, the output voltage $V_3$ and the voltage $V_2$ are provided for enabling the bus signal transmission between the bus blocks 530 and 520. Thus, the voltages $V_0$, $V_1$, $V_2$, $V_3$, $V_4$ and $V_5$ are provided for enabling bus signal transmission in the vertical bus circuit 400. In other words, a common voltage level shared by the bus blocks is used to enable bus signal transmission between the blocks, and the common voltage level can be provided by the voltage at the positive terminal of a cell in a battery pack and the output voltage of a LDO, in one embodiment.

The output voltages of the LDOs 452, 454 and 456, which are relatively stable, provide power supplies for enabling bus signal transmission in the vertical bus circuit 400. Thus, the vertical bus circuit 400 is not influenced by the cell voltage fluctuation during rapid charging or discharging, and thus is relatively reliable.

Nodes 402, 404, 406 serve as I/O ports of the bus blocks 420, 430 and 440. As described hereinbefore, the bus signal at each node can be transmitted in upward and forward directions. For example, the bus signal at the node 402 can be transmitted to the nodes 404, 406, and the bus signal can be transmitted from the nodes 404, 406 and received at the node 402. Thus, each of the bus blocks 420, 430 and 440 uses two I/O ports (e.g., the nodes 402 and 404 of the bus block 420) for a 1-wire bus. In another embodiment, the bus blocks use four I/O ports (not shown) for a 2-wire bus. Therefore, the pin counts of the IC chips of the bus blocks can be reduced.

The I/O devices are open-drain, and thus, the I/O devices are relatively flexible and can be configured as Inter-Integrated Circuit ($I^2C$), Serial Peripheral Interface (SPI) or some other type of bus. Furthermore, the vertical bus circuit 400 does not need power consumption in the static state. The bus signal transmitted in each bus block of the vertical bus circuit 400 is a differential signal; for example, in signal path 422, if the FET 423 is turned on or turned off is determined by the voltage difference between the voltage at the node 452 and the voltage at the node 456. Thus, relatively high bus signal speed and relatively better tolerance can be obtained.

The nodes 402, 404 and 406 will not suffer over-voltage transients since the operating voltage of each node is within its I/O device's power supply voltage range. For example, the operating voltage of the node 402 is from $V_0$ to $V_1$.

The maximum number of the cells in each of the battery pack 412, 414 and 416 is determined by the maximum allowed $V_{ds}$ of FET in the bus block coupled to the battery pack and the output voltage of the LDO in the bus block on top of this bus block. For example, as shown in FIG. 4, the maximum allowed $V_{ds}$ of FET 425/427 in the bus block 420 equals the voltage difference between $V_3$ and $V_2$ plus the voltage provided by the battery pack 412, wherein the voltage difference between $V_3$ and $V_2$ is the output voltage of the LDO 454 in the bus block 430. Thus, the maximum number of the cells in the battery pack 412 can be given in equation (1) as follows:

$$N=(V_{ds}-V_{LDO})/V_{cell} \quad (1)$$

N is the maximum number of the cells in the battery pack 412, $V_{ds}$ is the maximum allowed $V_{ds}$ of FET 425/427, $V_{LDO}$ is the output voltage of the LDO 454 in the bus block 430, and $V_{cell}$ is a cell voltage.

Figure 5:
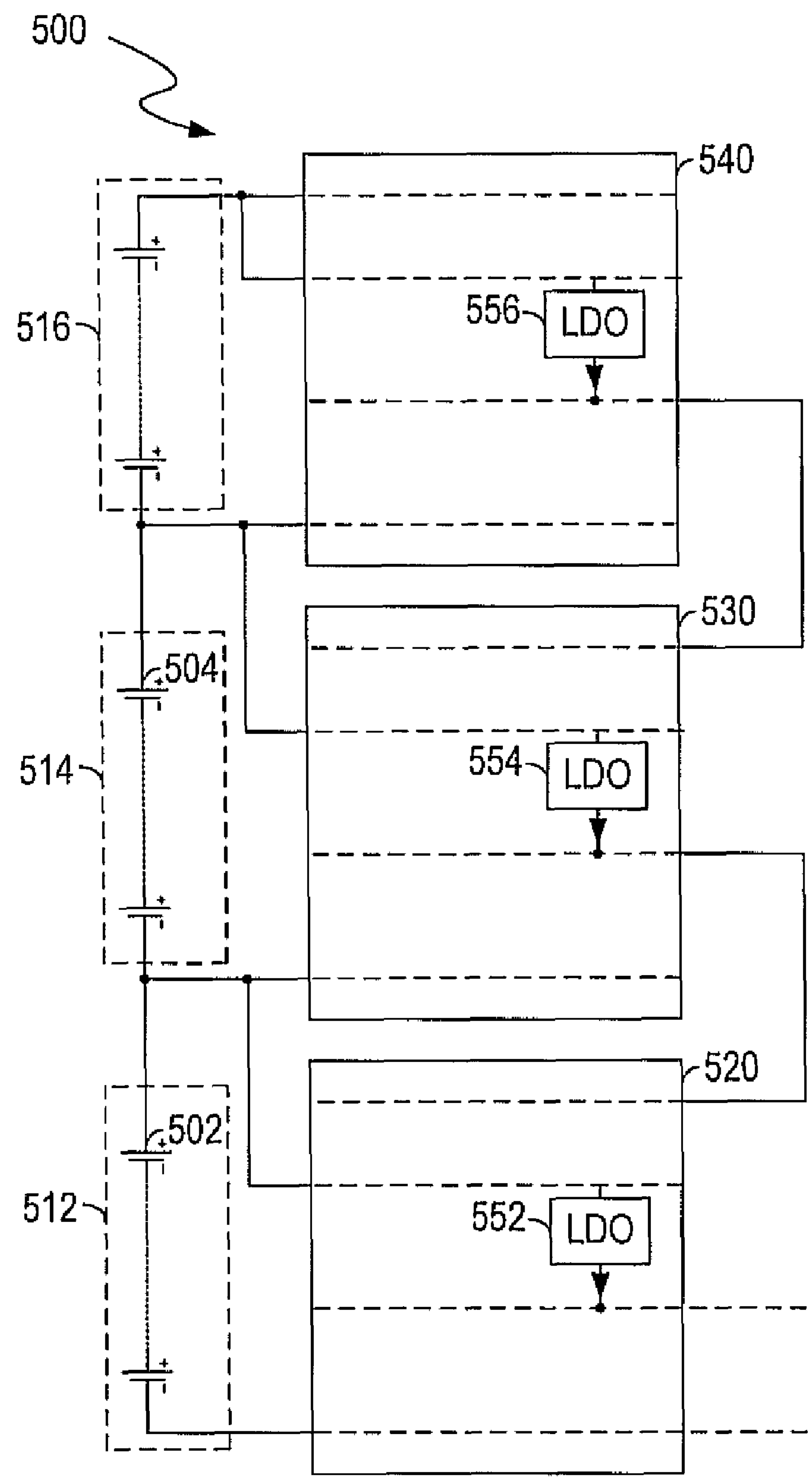
FIG. 5 is a block diagram showing a vertical bus topology for a battery management system according to one embodiment of the present invention.

FIG. 5 shows a vertical bus topology 500 for a battery management system according to one embodiment of the present invention. The vertical bus topology 500 is used for an $I^2C$ bus application. The vertical bus topology 500 includes bus blocks 520, 530 and 540. The bus blocks 520, 530 and 540 are coupled to battery packs 512, 514 and 516. Multiple voltage regulators are included in the bus blocks 520, 530 and 540, respectively. In this embodiment, the multiple voltage regulators can be the LDOs 552, 554 and 556.

Although three bus blocks are shown in FIG. 5, the present invention is not so limited.

The voltage at the positive terminal of one cell in each of the battery packs 512, 514 and 516 and the output voltage of the LDO are provided for enabling bus signal transmission through the bus blocks 520, 530 and 540, in one embodiment. For example, the voltage at the positive terminal of a cell 504 in the battery pack 514 is supplied to the LDO 554, and an output voltage is output by the LDO 554. Thus, the output voltage output by the LDO 554 and the voltage at the positive terminal of a cell 502 in the battery pack 512 are provided for enabling bus signal transmission between the bus blocks 530 and 520. As described hereinbefore, each of the bus blocks 520, 530 and 540 are able to communicate with the other bus blocks using, for example, the $I^2C$ bus protocol.

Figure 6:
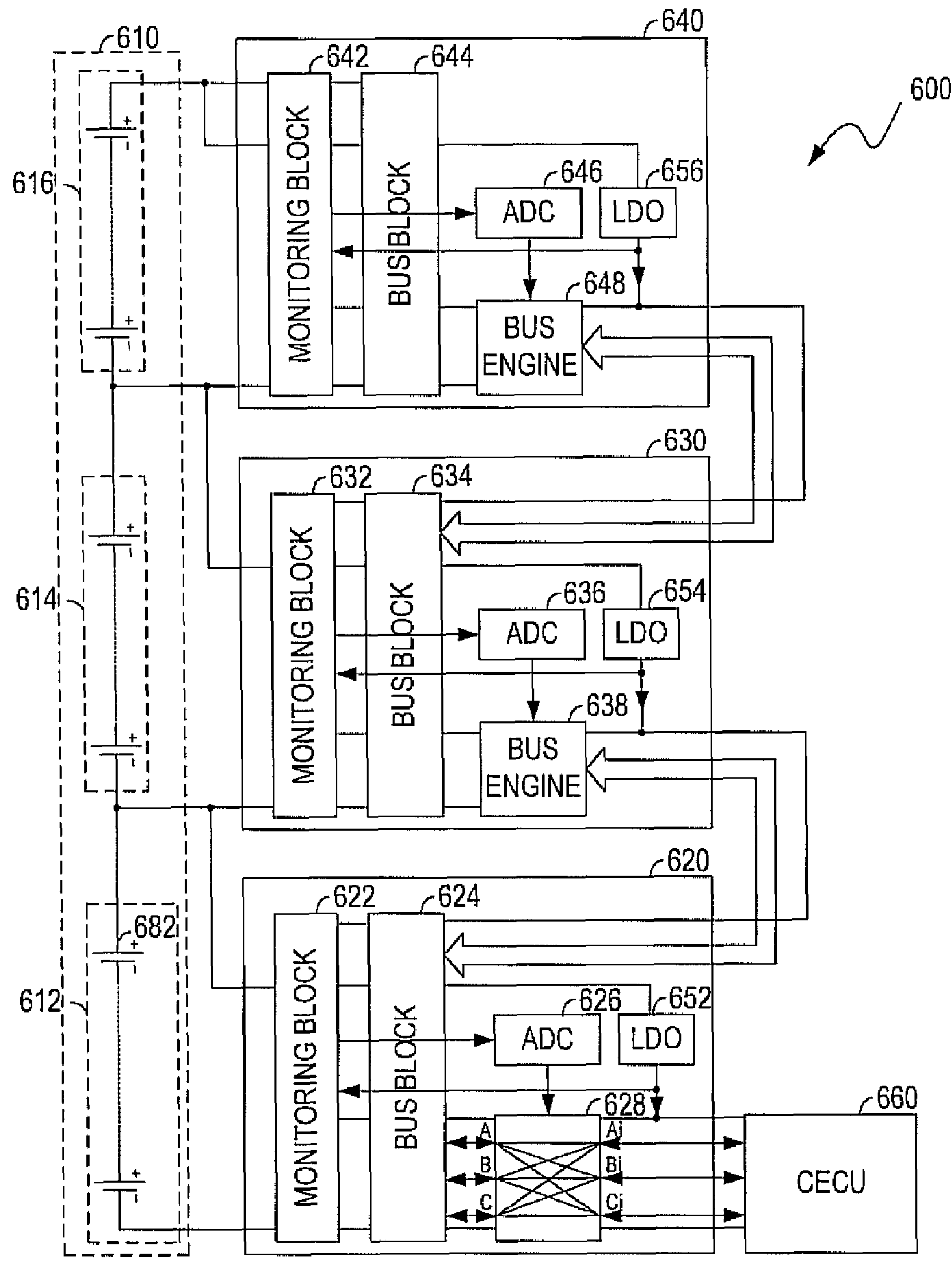
FIG. 6 is a block diagram showing a battery management system according to one embodiment of the present invention.

FIG. 6 shows a battery management system 600 according to one embodiment of the present invention. The battery management system 600 includes a battery 610, AFE devices 620, 630 and 640, and a CECU 660. The battery 610 includes battery packs 612, 614 and 616. The AFE devices 620, 630 and 640 coupled to the battery 610 can access the status of cells in the battery 610. The CECU 660 coupled to the AFE device 620 can communicate with a destination AFE device of the AFE devices 620, 630 and 640.

Although three bus blocks are shown in FIG. 6, the present invention is not so limited.

In one embodiment, the AFE devices 620, 630 and 640 are identical, and can be formed as identical integrated circuit (IC) chips. The AFE device 620 includes a monitoring block 622, a bus block 624, analog-to-digital converter (ADC) 626, a bus engine 628, a LDO 652 and I/O devices (not shown), in one embodiment. Similarly, the AFE device 630 includes a monitoring block 632, a bus block 634, an ADC 636, a bus engine 638, a LDO 654 and I/O devices (not shown). The AFE device 640 includes a monitoring block 642, a bus block 644, an ADC 646, a bus engine 648, a LDO 656 and I/O devices (not shown). In one embodiment, each of the bus blocks 624, 634 and 644 includes an upward signal path (e.g., the upward signal path 422 shown in FIG. 4) and a downward signal path (e.g., the downward signal path 424 shown in FIG. 4) to transmit bus signal in upward direction and downward direction, respectively.

The voltage at the positive terminal of one cell in each of the battery packs 612, 614 and 616 and the output voltage of the LDOs 652, 654, and 656 provide the common voltage level to enable bus signal transmission through the AFE devices 620, 630, and 640, in one embodiment. For example, the voltage at the positive terminal of the cell 682 in the battery pack 612 and the output voltage of the LDO 654 in the bus block 630 provide the common voltage level to enable the bus signal transmission between the AFE devices 620 and 630.

The AFE devices 620, 630 and 640 are used for monitoring the status of each cell in the battery packs and for communicating with the CECU 660 through a vertical bus configured by the bus blocks 624, 634, and 644, the bus engines 628, 638, and 648 and the I/O devices (not shown).

Taking the AFE device 620 as an example, the monitoring block 622 in the AFE device 620 is used for monitoring the status of the battery, e.g., battery voltage, cell voltage, cell temperature, battery current and sending monitoring signals indicative of the status of the battery to the ADC 626, in one embodiment. The ADC 626 in the AFE device 620 converts the status of the battery, which is an analog signal, into a digital signal and transmits the digital signal to the bus engine 628. The bus engine 628 is a controller in the AFE device 620 and can communicate with the CECU 660.

Each of the AFE devices 620, 630, and 640 can work in a master mode or a slave mode to communicate with the CECU 660. When an AFE device works in the master mode, the bus engine in the AFE device can issue a signal for communication with the CECU 660. For example, when the AFE device 640 works in the master mode, the bus engine 648 issues an alert signal to the CECU 660. The alert signal is transmitted to the bus engines 638 and 628 by the vertical bus and then is transmitted to the CECU 860. When an AFE device works in the slave mode, the CECU 660 issues a signal for communication with the bus engine of the AFE device. For example, when the AFE device 640 works in the slave mode, signals from the CECU 660 are transmitted to the bus engine 628 in the AFE device 620 and then are transmitted to the bus engine 648 in the AFE device 640 by the vertical bus.

When a 2-wire bus protocol is used in the architecture 600, each bus engine uses three bus lines for relatively better error tolerance. As shown in FIG. 6, the bus engine 628 has three ports A, B and C on the left side of the bus engine 628 and three ports $A_i$, $B_i$, and $C_i$ on the right side of the bus engine 628. For example, if the ports A, B, $A_i$ and $B_i$ are rendered as default ports to transmit the bus signals and if the port B is erroneous, then the port C can be used as a backup port to transmit the bus signal. Thus, relatively better error tolerance can be obtained. When a 1-wire bus protocol is used in the architecture 600, each bus engine uses two bus lines for relatively better error tolerance, in one embodiment.

The LDOs 652, 654 and 656 provide reference voltages for on-line diagnosis and calibration, in one embodiment. The CECU 660 further includes an accurate internal ADC (not shown) for on-line diagnosis and calibration, in one embodiment. The output voltage of the LDO 652 is converted by the accurate internal ADC in the CECU 660 and the ADC 626 in the AFE device 620. If the two converted results are not equal, then the ADC 626 will be calibrated. Similarly, the voltage of the LDO 654 is converted by the calibrated ADC 626 and the ADC 636 in the AFE device 630 so as to diagnose and calibrate the ADC 636. As a result, all the ADCs in the AFE devices 620, 630, and 640 can be diagnosed and calibrated. Therefore, it's relatively easy to do on-line diagnosis and calibration in the battery management system 600.

An external accurate reference voltage (not shown) can be used as the reference voltages provided by the LDOs 652, 654 and 656 for on-line diagnosis and calibration of the ADCs.

Figure 7:
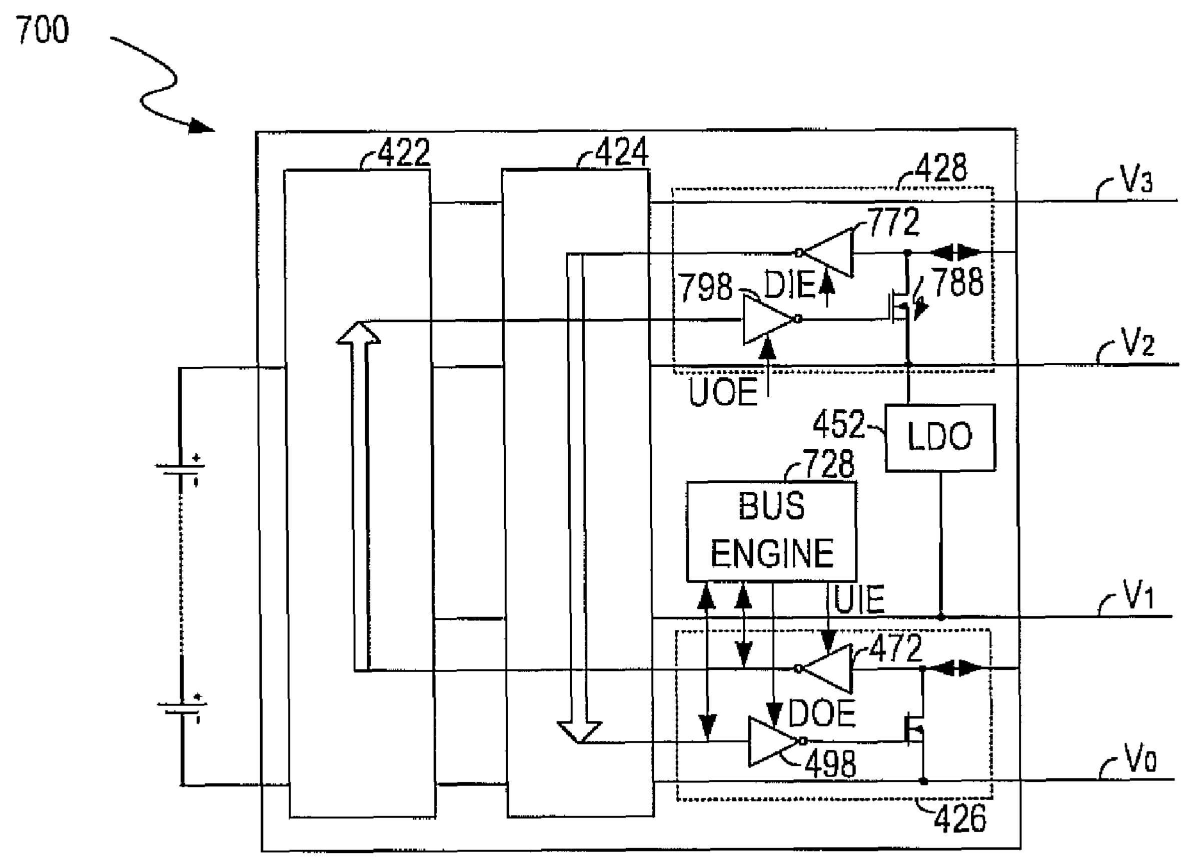
FIG. 7 is a block diagram showing an AFE device in a battery management system according to one embodiment of the present invention.

FIG. 7 shows an AFE device 700 according to one embodiment of the present invention. Elements labeled the same as in FIG. 4 have similar functions. In the embodiment of FIG. 7, the AFE device 700 includes the upward signal path 422, the downward signal path 424, the I/O devices 426 and 428, the LDO 452, and a bus engine 728. The I/O device 426 can include the inverter gates 472 and 498. Similarly, the I/O device 428 can include two inverter gates 772 and 798.

Advantageously, the AFE device 700 can perform a self-test function. More specifically, by controlling the inverter gates 772, 798, 472 and 498 in the I/O devices 428 and 426, if an undesirable condition (e.g., a disconnect) occurs in the upward signal path 422 or in the downward signal path 424, then it can be detected, in one embodiment.

In one embodiment, a control signal upward input enable (UIE) can be input into the inverter gate 472, and a control signal downward output enable (DOE) can be input into the inverter gate 498. Similarly, a control signal upward output enable (UOE) can be input into the inverter gate 798, and a control signal downward input enable (DIE) can be input into the inverter gate 772. The control signals are used for controlling the inverter gates 472, 798, 772 and 498, in one embodiment.

The bus engine 728 can determine if the undesirable condition occurs in the signal paths 422 and 424 by controlling the inverter gates 498, 472, 772 and 798. In one embodiment, the control signals DOE and UIE, which are logic "0," and the control signals DIE and UOE, which are logic "1," can be sent from the bus engine 728 to control the inverter gates 498, 472, 772 and 798, respectively. Thus, the inverter gates 498 and 472 can be disabled and the inverter gates 772 and 798 can be enabled, in one embodiment. The bus engine 728 can send a test signal to the upward signal path 422. If the undesirable condition does not occur, the test signal can be fed back to the bus engine 728 via a loop formed by the upward signal path 422, the inverter gate 798, the FET 788, the inverter gate 772 and the downward signal path 424. Thus, the undesirable condition can be detected if the bus engine 728 does not receive the test signal.

In one embodiment, the bus engine 728 can further determine the location of the undesirable condition, for example, in the upward signal path 422 or in the downward signal path 424. In this instance, the bus block 420 (FIG. 4) may further include multiple upward signal paths and multiple downward signal paths (not shown). Once the presence of an undesirable condition is detected, the bus engine 728 can send a test signal along a different upward signal path. If the bus engine 728 can receive that test signal, then the undesirable condition occurs in the upward signal path 422. Otherwise, the undesirable condition occurs in the downward signal path 424.

When the location of the undesirable condition is determined, a flag indicative of the location of the undesirable condition can be set in the bus engine 728, in one embodiment.

Figure 8:
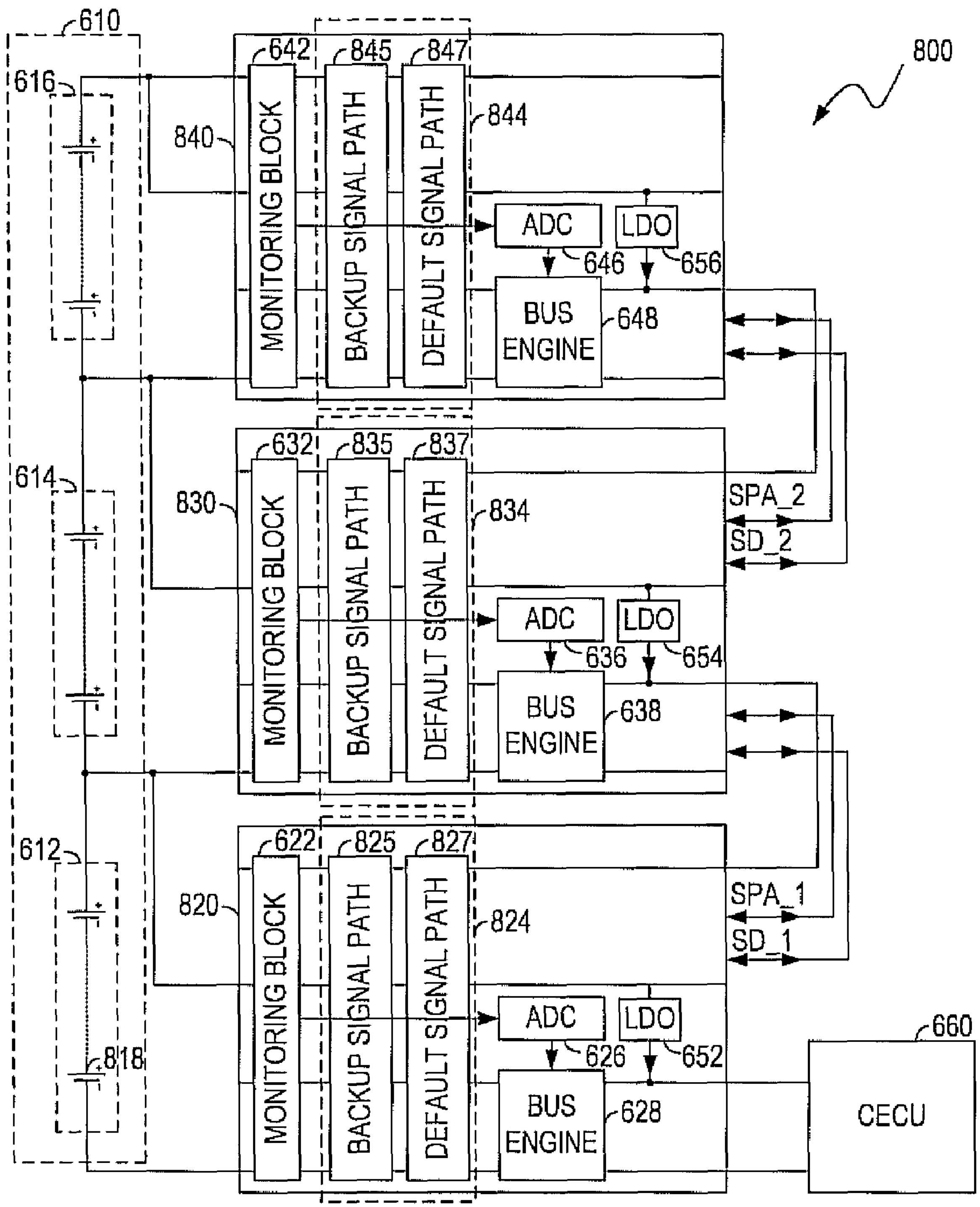
FIG. 8 is a block diagram showing a battery management system according to one embodiment of the present invention.

FIG. 8 shows a battery management system 800 according to one embodiment of the present invention. Elements labeled the same as in FIG. 6 have similar functions.

In the embodiment of FIG. 8, the battery management system 800 includes a battery 610, AFE devices 820, 830 and 840, and the CECU 660. The battery 610 includes battery packs 612, 614 and 616. The AFE devices 820, 830 and 840 coupled to the battery 610 can access the status of cells in the battery 610. The CECU 660 is coupled to an AFE device of the AFE devices 820, 830 and 840 and can communicate with a destination AFE device. Advantageously, the CECU 660 can communicate with the destination AFE device via a default path and can communicate with the destination AFE device via a backup path if an undesirable condition occurs in the default path. In one embodiment, the undesirable condition can include a disconnect in the default path.

Although three AFE devices are shown in FIG. 8, the present invention is not so limited.

In the embodiment of FIG. 8, the CECU 660 is coupled to the AFE device 820 that is powered by a cell 818 that has the lowest voltage level among the cells in the battery 610.

In one embodiment, the AFE devices 820, 830 and 840 are identical, and can be formed as identical integrated circuit (IC) chips. In the embodiment of FIG. 8, the AFE device 820 includes the monitoring block 622, a bus block 824, the ADC 626, the bus engine 628, the LDO 652 and I/O devices (not shown). The monitoring block 622 can output monitoring signals that indicate a status of a respective cell. The bus block 824 can include an internal signal path (e.g., an internal default signal path 827 and an internal backup signal path 825) inside the bus block 824 for transmitting the monitoring signals. In one embodiment, the internal default signal path 827 can include an upward signal path (e.g., the upward signal path 422 shown in FIG. 4) and a downward signal path (e.g., the upward signal path 424 shown in FIG. 4). The internal backup signal path 825 can include the upward signal path 422 shown in FIG. 4 and the downward signal path 424 shown in FIG. 4 to serve as a backup if the undesirable condition occurs in the internal default signal paths 827.

Similarly, the AFE device 830 can include the monitoring block 632, a bus block 834, the ADC 636, the bus engine 638, the LDO 654 and I/O devices (not shown). The bus block 834 can include an internal default signal path 837 and an internal backup signal path 835. The AFE device 840 can include the monitoring block 642, a bus block 844, the ADC 646, the bus engine 648, the LDO 656 and I/O devices (not shown). The bus block 844 can include an internal default signal path 847 and an internal backup signal path 845.

An external signal path outside the devices is coupled between the AFE devices 820, 830, and 840, and can transmit the monitoring signals between the AFE devices. In one embodiment, the external signal path can include an external default signal path and an external backup signal path. The external backup signal paths can serve as a backup if the undesirable condition occurs in the external default signal path.

In the embodiment of FIG. 8, the battery management system 800 is configured for a 1-wire bus, and an external default signal paths SD_1 and an external backup signal path SPA_1 are coupled between the AFE devices 820 and 830. The external backup signal path SPA_1 can serve as a backup if the undesirable condition occurs in the signal path SD_1. Similarly, an external default signal path SD_2 and an external backup signal path SPA_2 are coupled between the AFE devices 830 and 840.

Although one external default signal path and one external backup signal path between each two AFE devices are shown in FIG. 8, the present invention is not so limited.

The control unit 660 can communicate with the destination AFE device via a default path. In one embodiment, the default path can include a path via the CECU 660, the internal default signal path 827 in the AFE device 820, multiple internal default signal paths inside the AFE devices and multiple external default signal paths between the AFE device 820 and the destination AFE device, in one embodiment. For example, when the AFE device 840 is the destination AFE device and a signal is sent from the control unit 660, the default path for transmitting the signal to the AFE 840 can be via the control unit 660, the bus engine 628, the upward signal path in the internal default signal path 827, the external default signal path SD_1, the bus engine 638, the upward signal path in the internal default signal path 837, the external default signal path SD_2, and the bus engine 648.

The CECU 660 can determine if an undesirable condition occurs in the default path. In one embodiment, when each AFE device receives the signal which is sent from the CECU 660, a feedback signal can be generated by the AFE device and transmitted to the CECU 660. As such, after the signal is sent from the CECU 660, if the CECU 660 receives the feedback signals from the bus engines 628 and 638 and doesn't receive a feedback signal from the bus engine 648, the undesirable condition may occur in the upward signal path in the internal default signal path 837, the external default signal path SD_2, or the bus engine 648. Then, the bus engine 638 can do the self-test as described above.

If the bus engine 638 detects that the undesirable condition occurs in the upward signal path in the internal default signal path 837, the signal can be sent from the CECU 660 once again and transmitted to the AFE device 840 via the backup path which is different from the default path in that the upward signal path in the internal default signal path 837 is replaced by the upward signal path in the internal backup signal path 835, in one embodiment. Otherwise, the signal can be transmitted to the AFE device 840 via the backup path which is different from the default path in that the external default signal path SD_2 is replaced by the external backup signal path SPA_2 that is located between the AFE devices 830 and 840, in one embodiment. As a result, the reliability of the system 800 can be improved.

Although one internal backup signal path in each AFE device is shown in FIG. 8, the present invention is not so limited. Multiple internal backup signal paths can be included in each AFE device, and thus higher reliability of the system 800 can be obtained.

Figure 9:
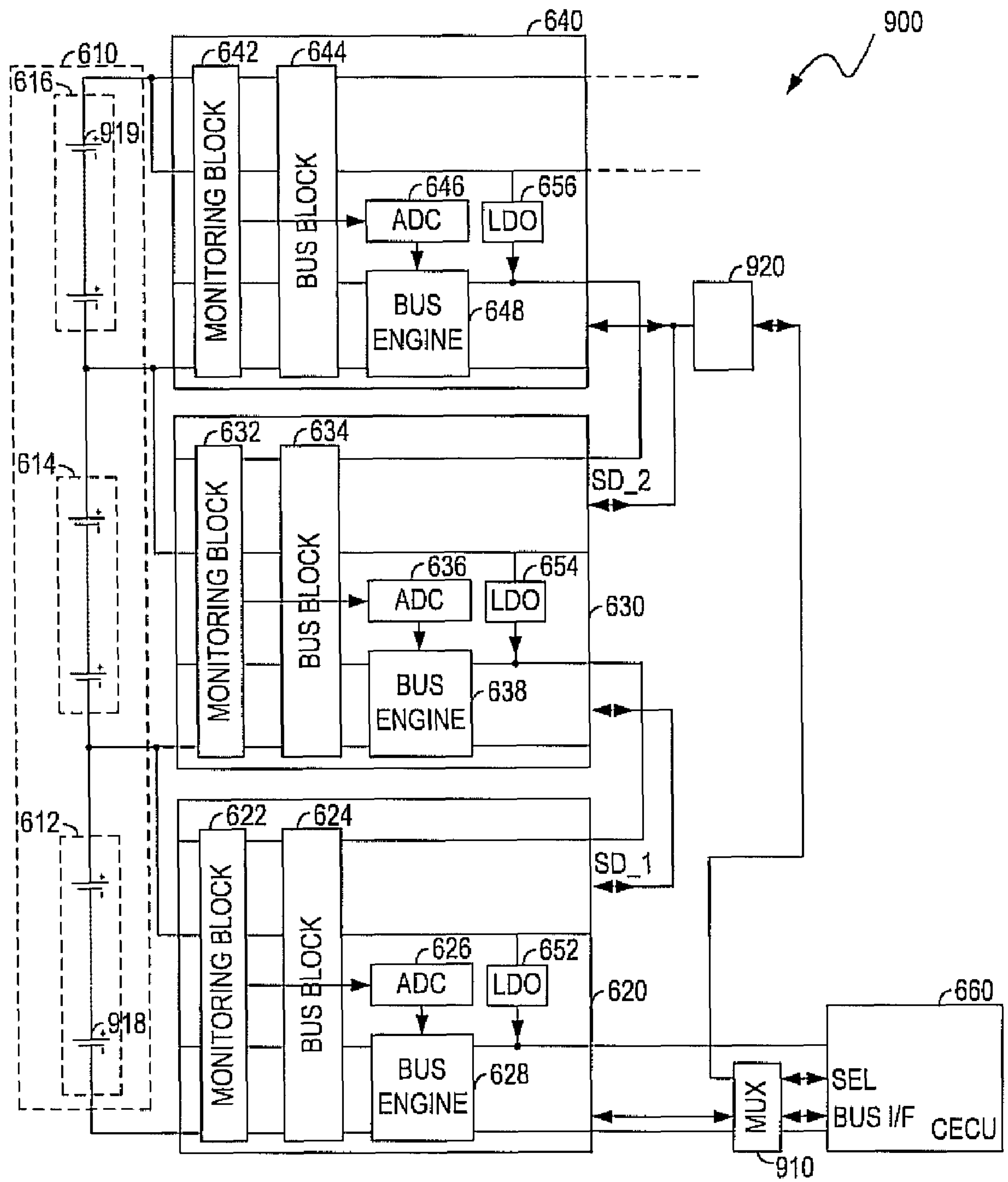
FIG. 9 is a block diagram showing a battery management system according to another embodiment of the present invention.

FIG. 9 shows a battery management system 900 according to another embodiment of the present invention. Elements labeled the same as in FIG. 6 have similar functions.

In the embodiment of FIG. 9, the battery management system 800 includes a battery 610, the AFE devices 620, 630 and 640, the CECU 660, an isolator 920 and a multiplexer (MUX) 910. The isolator 920 can be a transformer, an opto-coupler, or the like. The battery 610 includes battery packs 612, 614 and 616. The AFE devices 620, 630 and 640 coupled to the battery 610 can access the status of cells in the battery 610. The CECU 660 coupled to at least two AFE devices can communicate with a destination AFE device. In the embodiment of FIG. 9, the CECU 660 is coupled to the AFE devices 620 and 640. The AFE device 620 is powered by a cell 918 that has the lowest voltage level among the cells in the battery 610. The AFE device 640 is powered by a cell 919 that has the highest voltage level among the cells in the battery 610.

Although three AFE devices are shown in FIG. 9, the present invention is not so limited.

Advantageously, the control unit 660 can communicate with the destination AFE device via a default path and can communicate with the destination AFE device via a backup path if an undesirable condition occurs in the default path. In one embodiment, the default path includes a first set of multiple AFE devices, the backup path includes a second set of multiple AFE devices, and the first set of multiple AFE devices and the second set of multiple AFE devices are different. In one embodiment, the undesirable condition can include a disconnect in the default path.

In the embodiment of FIG. 9, the CECU 660 has one bus interface (bus I/F); thus, the MUX 910 is used and can be controlled by the CECU 660 to select the default path or the backup path to enable the communication. The isolator 920 can convert the voltage level of the signal that is sent from the CECU 660, and thus the signal can be transmitted via the backup path.

In one embodiment, the AFE devices 620, 630 and 640 are identical, and can be formed as identical integrated circuit (IC) chips. In the embodiment of FIG. 9, the AFE device 620 includes the monitoring block 622, the bus block 624, the ADC 626, the bus engine 628, the LDO 652 and I/O devices (not shown). The monitoring block 622 can output the monitoring signals that indicate a status of a respective cell. The bus block 624 can include an internal signal path to transmit the monitoring signals. In one embodiment, the internal signal path can include an upward signal path (e.g., the upward signal path 422 in FIG. 4) and a downward signal path (e.g., the downward signal path 424 in FIG. 4).

Similarly, the AFE device 630 includes the monitoring block 632, the bus block 634, the ADC 636, the bus engine 638, the LDO 654 and I/O devices (not shown). The AFE device 640 includes the monitoring block 642, the bus block 644, the ADC 646, the bus engine 648, the LDO 656 and I/O devices (not shown).

In the embodiment of FIG. 9, the battery management system 900 is configured for a 1-wire bus. The AFE devices 620 and 630 are coupled via an external signal path SD_1, in one embodiment. Similarly, the AFE devices 630 and 640 are coupled via an external signal path SD_2, in one embodiment. Although one external signal path between each two AFE devices is shown in FIG. 9, the present invention is not so limited.

As mentioned above, the control unit 660 can communicate with the destination AFE device via the default path and can communicate with the destination AFE device via a backup path if an undesirable condition occurs in the first path. In one embodiment, the default path can be via the control unit 660, the internal signal path in the AFE device 620, multiple internal signal paths inside the AFE devices and multiple external signal paths between the AFE device 620 and the destination AFE device. The backup path can be via the CECU 660, the internal signal path in the AFE device 640, multiple internal signal paths inside the AFE devices and multiple external signal paths between the AFE device 640 and the destination AFE device. In other words, the signal from the CECU 660 can be transmitted to the destination AFE device in an upward direction and can be transmitted to the destination AFE device in a downward direction if an undesirable condition occurs in the upward direction.

When the AFE device 640 is the destination AFE device and a signal is sent from the CECU 660, the default path for transmitting the signal to the AFE device 640 can be via the control unit 660, the bus engine 628, the internal signal path in the bus block 624, the external signal path SD_1, the bus engine 638, the internal signal path in the bus block 634, the external signal path SD_2, and the bus engine 648.

The CECU 660 can determine if the undesirable condition occurs in the default path. In one embodiment, when each AFE device receives the signal which is sent from the CECU 660, a feedback signal can be generated by the AFE device and transmitted to the CECU 660. As such, after the signal is sent from the CECU 660, if the CECU 660 receives the feedback signals from the bus engines 628 and 638 and doesn't receive a feedback signal from the bus engine 648, the undesirable condition occurs in the default path. Thus, the signal can be sent from the CECU 660 once again and transmitted via the backup path. In this instance, the backup path is via the control unit 660 and the bus engine 648. As a result, the reliability of the system 900 can be improved.

In one embodiment, the CECU 660 can be coupled to at least two AFE devices. As a result, higher reliability of the system 900 can be obtained.

In one embodiment, each AFE device in the battery management system 900 can further include an internal backup signal path and an external backup signal path, which can be used a backup if the undesirable condition occurs as described above. As a result, higher reliability of the system 900 can be obtained.

Figure 10:
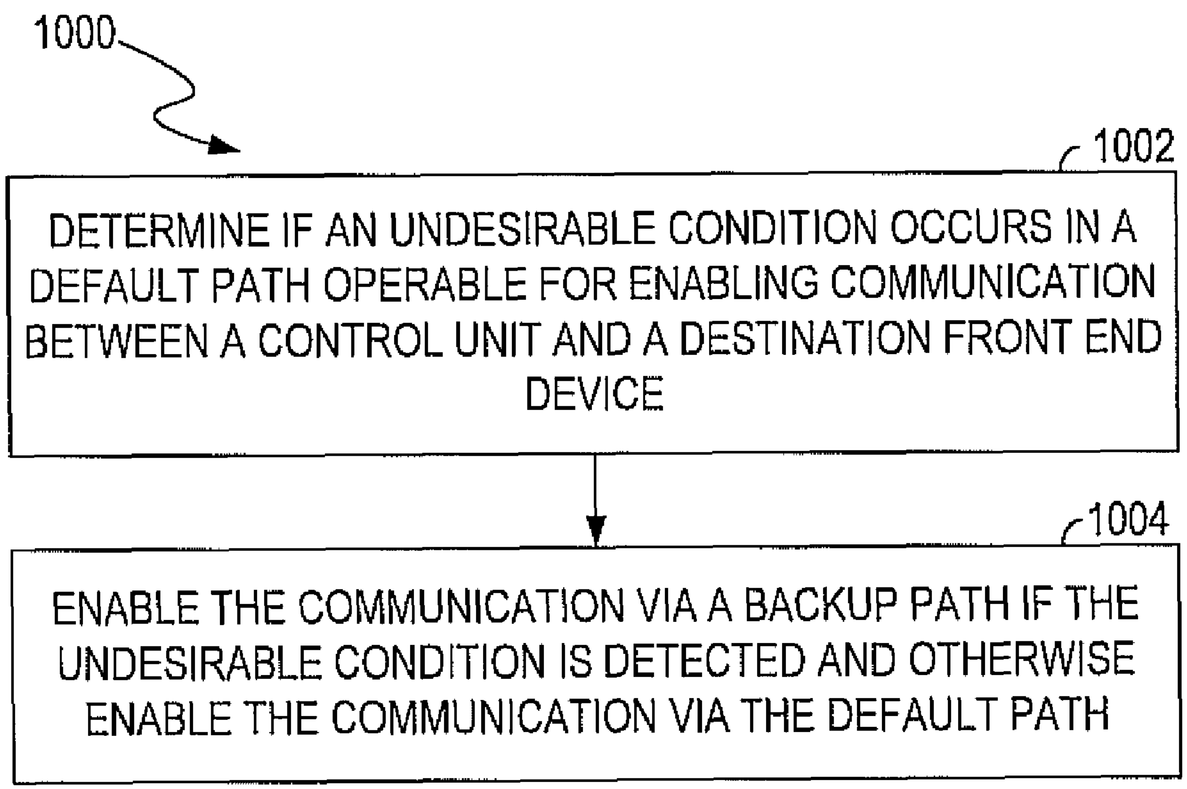
FIG. 10 is a flowchart of a method for enabling communication in a battery management system according to one embodiment of the present invention.

FIG. 10 shows a flowchart 1000 of a method for enabling communication in a battery management system according to one embodiment of the present invention. FIG. 10 is described in combination with FIG. 8 and FIG. 9.

In block 1002, the CECU 660 can determine if an undesirable condition occurs in a default path operable for enabling communication between the CECU 660 and a destination device. In the embodiment of FIG. 8, the default path can include a path via the CECU 660, the internal default signal path 827 in the AFE device 820, multiple internal default signal paths inside the AFE devices and multiple external default signal paths between the AFE device 820 and the destination AFE device. In the embodiment of FIG. 9, the default path can include a path via the control unit 660, the internal signal path in the bus block 624, multiple internal signal paths inside the AFE devices and multiple external signal paths between the AFE device 620 and the destination AFE device. The CECU 660 can determine if the undesirable condition occurs in the default path as described above.

In block 1004, communication can be enabled via a backup path if the undesirable condition is detected, and otherwise communication can be enabled via the default path. In the embodiment of FIG. 8, if the undesirable condition occurs in an internal default signal path in the default path, the backup path can be a path as described above. In the embodiment of FIG. 8, if the undesirable condition occurs in an external default signal path in the default path, the backup path can be a path as described above. In the embodiment of FIG. 9, the backup path can be a path as described above.

While the foregoing description and drawings represent embodiments of the present invention, it will be understood that various additions, modifications and substitutions may be made therein without departing from the spirit and scope of the principles of the present invention. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, and not limited to the foregoing description.

What is claimed is:

1. A battery management system, comprising:

a battery having a plurality of cells;

a plurality of devices coupled to said battery and operable for assessing the statuses of said cells; and a control unit coupled to a first device of said devices and operable for communicating with a destination device of said devices via a default path and for communicating with said destination device via a backup path if an undesirable condition occurs in said default path.

2. The system of claim 1, wherein said undesirable condition comprises a disconnect in said default path.

3. The system of claim 1, wherein said control unit is further coupled to a second device of said devices.

4. The system of claim 3, wherein said default signal path comprises a first plurality of said devices and said backup signal path comprises a second plurality of said devices, wherein said first plurality of said devices and said second plurality of said devices are different.

5. The system of claim 4, wherein said devices are powered by said cells and share a plurality of common voltage levels provided by said cells.

6. The system of claim 5, wherein said first device comprises a device powered by a cell that has the lowest voltage level among said cells.

7. The system of claim 5, wherein said second device comprises a device powered by a cell that has the highest voltage level among said cells.

8. A battery management system, comprising:

a battery having a plurality of cells;

a plurality of devices coupled to said battery and operable for assessing the statuses of said cells, wherein each of said devices comprises:

a monitoring block operable for outputting monitoring signals that indicate a status of a respective cell; and a bus block coupled to said monitoring block operable for transmitting said monitoring signals, wherein said bus block comprises an internal signal path inside said bus block, wherein an external signal path outside said devices is coupled between said devices and is operable for transmitting said monitoring signals between said devices; and a control unit coupled to a first device of said devices and operable for communicating with a destination device of said devices via a default path and for communicating with said destination device via a backup path if an undesirable condition occurs in said default path.

9. The system of claim 8, wherein said undesirable condition comprises a disconnect in said default path.

10. The system of claim 8, wherein said internal signal path comprises an internal default signal path and said external signal path comprises an external default signal path.

11. The system of claim 10, wherein said default path comprises a path via said control unit, an internal default signal path in said first device, a first plurality of internal default signal paths inside a first plurality of said devices and a first plurality of external default signal paths between said first device and said destination device.

12. The system of claim 11, wherein said internal signal path further comprises an internal backup signal path.

13. The system of claim 12, wherein said backup path comprises a path that is different from said default path in that, if said undesirable condition occurs in an internal default signal path in said first device, then said internal default signal path in said first device is replaced by an internal backup signal path that is located in said first device.

14. The system of claim 11, wherein said external signal path further comprises an external backup signal path.

15. The system of claim 14, wherein said backup path comprises a path that is different from said default path in that, if said undesirable condition occurs in an external default signal path in said first plurality of external default signal paths between said first device and said destination device, then said external default signal path is replaced by an external backup signal path that is located between said first device and said destination device.

16. The system of claim 11, wherein said control unit is further coupled to a second device of said devices, and wherein said backup path comprises a path via said control unit, an internal default signal path in said second device, a second plurality of internal default signal paths inside a second plurality of said devices and a second plurality of external default signal paths between said second device and said destination device.

17. The system of claim 16, wherein said second device comprises a device powered by a cell that has the highest voltage level among said cells.

18. The system of claim 8, wherein said devices are powered by said cells and share a plurality of common voltage levels provided by said cells.

19. The system of claim 18, wherein said first device comprises a device powered by a cell that has the lowest voltage level among said cells.

20. A method for enabling communication in a battery management system, comprising:

determining if an undesirable condition occurs in a default path operable for enabling said communication between a control unit and a destination front end device; and enabling said communication via a backup path if said undesirable condition is detected and otherwise enabling said communication via said default path.

* * * * *